A. PANKEY.
PLOW.
APPLICATION FILED JULY 8, 1913.
1,143,309.
Patented June 15, 1915.
2 SHEETS—SHEET 1.
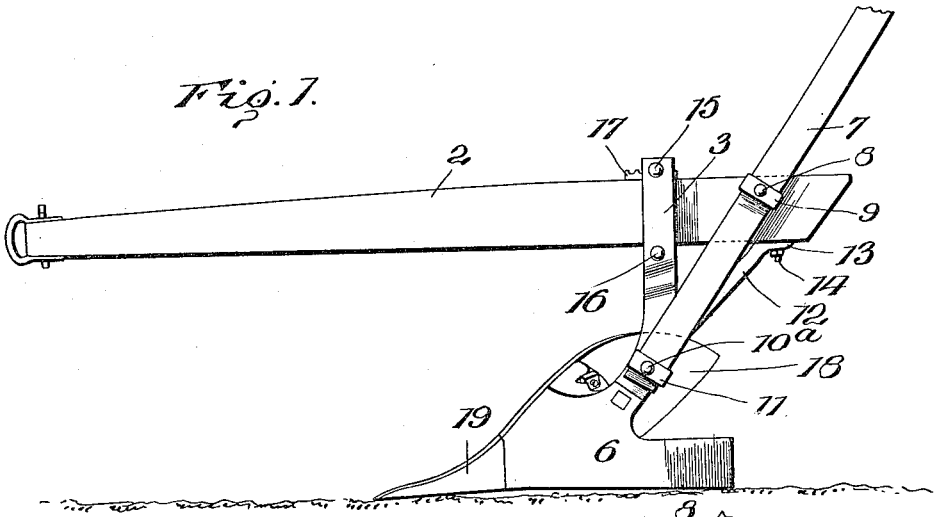
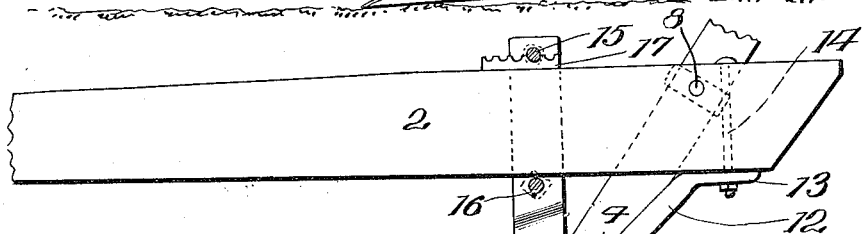
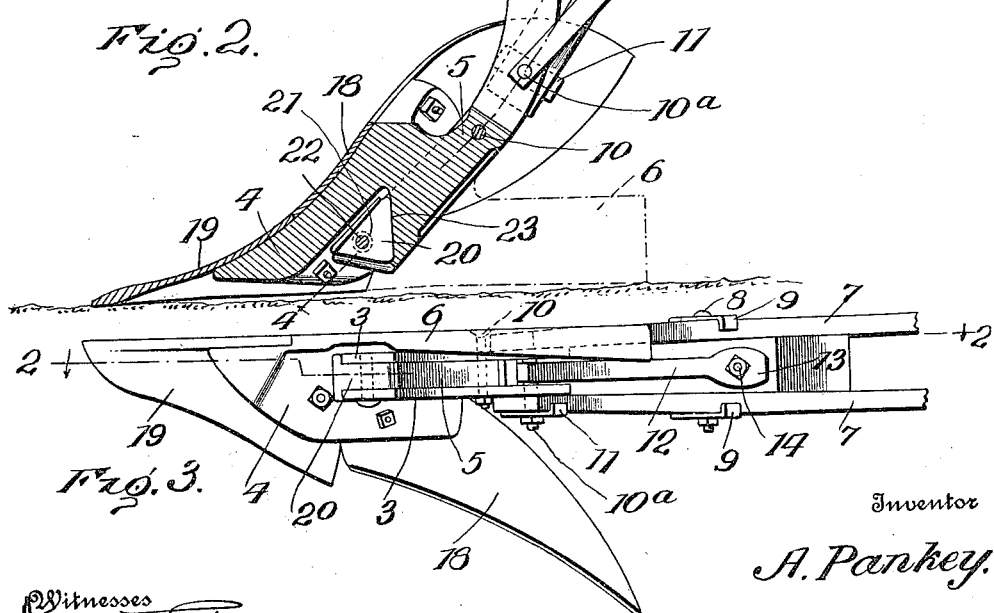
Inventor
A. Pankey.

A. PANKEY.
PLOW.
APPLICATION FILED JULY 8, 1913.

1,143,309.

Patented June 15, 1915.
2 SHEETS—SHEET 2.

Inventor
A. Pankey.

Witnesses

By

Attorneys.

UNITED STATES PATENT OFFICE.

ALEXANDER PANKEY, OF MERIDIAN, MISSISSIPPI.

PLOW.

1,143,309.  Specification of Letters Patent.  Patented June 15, 1915.

Application filed July 8, 1913. Serial No. 777,932.

*To all whom it may concern:*

Be it known that I, ALEXANDER PANKEY, citizen of the United States, residing at Meridian, in the county of Lauderdale and State of Mississippi, have invented certain new and useful Improvements in Plows, of which the following is a specification.

My invention relates to plows and particularly to the construction of the frog or bottom of the plow and the attachment of the handles to the plow.

The primary object of my invention is to provide a plow in which the handles are so disposed as to make a particularly rigid plow and to give the plowman greater leverage and thus greater power over the plow and more direct leverage for the control of the stock.

A further object of the invention is the provision of a plow in which the handles are extended down below the beam and pivotally attached to the companion bars of the stock.

A further object of the invention is the provision of a plow in which the handles extend below the beam and are pivotally connected to the plow by means of the same bolt which connects the foot brace to the stock.

A further object is to improve the means whereby the frog is attached to the companion bars.

A further object is to provide a plow in which the frog may be adjusted to any desired pitch.

Other objects will appear in the course of the following description.

Figure 4:
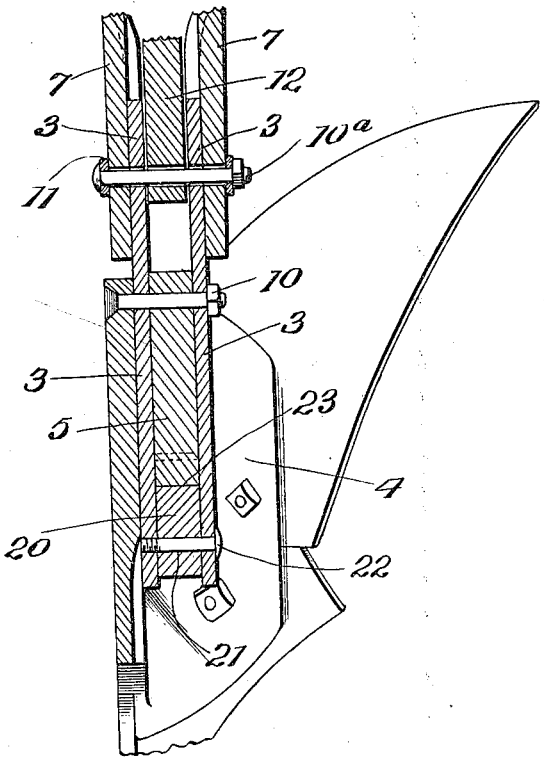
Figure 5:
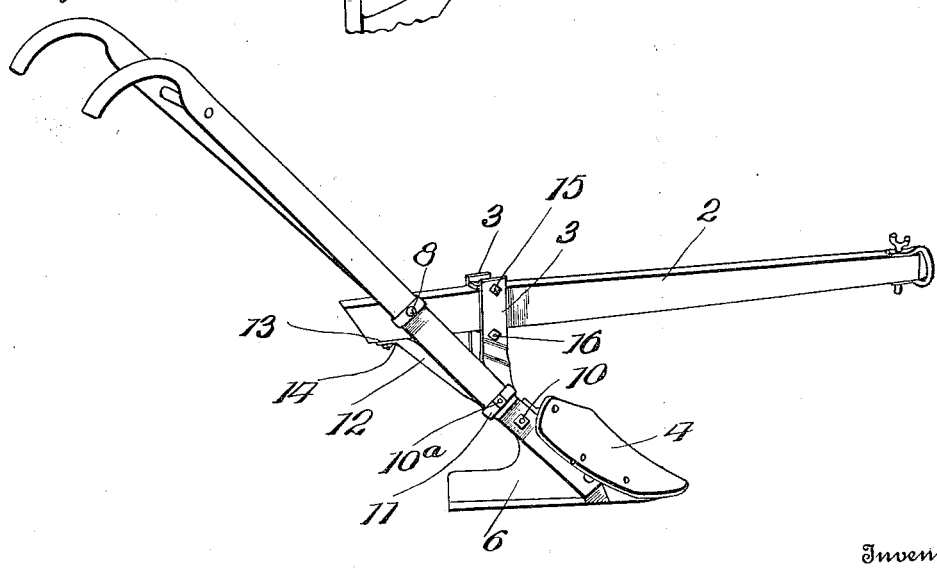

My invention is illustrated in the accompanying drawings, wherein:

Figure 1 is a side elevation of a plow constructed in accordance with my invention. Fig. 2 is a vertical sectional view of the plow shown in Fig. 1, the section being taken on the line 2—2 of Fig. 3 and looking in the direction of the arrow; Fig. 3 is an under side plan view of the plow shown in Fig. 2; Fig. 4 is an enlarged section on the line 4—4 of the plow shown in Fig. 2; Fig. 5 is a side elevation of a plow constructed in accordance with my invention, a shovel share being substituted for the turning share, however, as illustrated in Figs. 1 to 3.

Referring to these figures, 2 designates a plow beam of any usual or ordinary construction and 3 the companion bars of the plow. These bars extend downward and then are curved downward and forward and are spaced apart from each other. The frog 4 is of ordinary form but has a longitudinally extending lug 5 which is spaced from the landside 6, the body of the frog, the landside and the lug 5 all being cast or formed integral with each other. The companion bars 3 are disposed on either side of the central lug or rib 5, as illustrated in Fig. 3, and are bolted to the lug at the upper end of the latter by means of a transverse bolt $10^a$. The lower ends of the companion bars are connected with the frog by means which will be later stated and also by means of a bolt 10.

The handles 7 extend downward and forward on either side of the plow beam rearward of the companion bars 3 and are pivotally connected to the rear end of the plow beam by a transverse bolt 8 having clips 9 which each embrace one of the handles. The lower ends of the handles are pivoted to the companion bars by means of a transverse pivot bolt $10^a$, clips 11 being provided which embrace the lower ends of the handles. Bolted to the under face of the rear end of the plow beam is a foot brace 12 the rear end of which is horizontally turned, as at 13. A bolt 14 passes up through the plow beam 2 and through this terminal portion 13 of the brace 12. This brace 12 at its lower end is inserted between the companion bars 3 and acts to space these companion bars apart and through the lower end of this brace passes the bolt $10^a$ previously referred to. Thus it will be seen that the handles 7 and the foot brace 12 are both pivoted to the companion bars by the common bolt $10^a$. The companion bars extend upward on either side of the beam and are provided with transverse bolts 15 and 16 which extend respectively across the top of the beam and the bottom of the beam. The upper face of the beam carries a rack 17 with which the bolt 15 is adapted to be engaged. This rack has a plurality of notches each engageable with the bolt 15. There should be sufficient space between the bolts 15 and 16 so that the beam may be depressed to carry the rack 17 out of engagement with the bolt 15 and then shift it so that the inclination of the handles and therefore of the plow stock relative to the plow beam may be changed and the bolt 15 reëngaged in the proper notch of the rack 17. This will, of course, change the inclination of the plow stock and the pitch of the share attached to the stock.

In a plow stock constructed in accordance with my invention the handles have a pivotal engagement with the rear end of the beam instead of being rigidly engaged with the beam by the usual mortise. The handles also have pivotal engagement with the stock by means of the bolt 10ª. With my construction, when the standards are moved either forward or rearward, the handles are shifted also and thus there is no strain upon the rack. If the handles were fastened rigidly in a mortise or by bolts through the beam so that they could not move, strain on the rack would be exerted longitudinally of the beam and the rack would be thrown from its position.

As illustrated in Figs. 1 and 2, a mold board 18 is bolted to the frog and a plow point 19 is also bolted to the frog. While I have illustrated a turning share and a "pony" plow point as attached to the frog, I wish it distinctly understood that I may use any other form of share, sweep or shovel.

In Figs. 4 and 5 I have further illustrated my construction and particularly the construction as applied to a plow having a cultivator shovel mounted thereon instead of a turning share. A plow of the construction heretofore described operates even better as a shovel plow than as a turning plow, it being particularly designed for use as a cultivator plow. By extending the handles 7 below the beam and pivotally connecting the handles to the companion bars near to the ground or at the point where the pivot bolt 10ª for the foot brace passes through the companion bars, I secure great strength and rigidity for the plow foot and further I secure more leverage for the plowman and a more direct control of the stock. Furthermore, by fastening the handles on each side of the companion bars and using one bolt to connect the handles and foot brace together, I secure a very simple and effective construction and one wherein there are so few parts that there will be no rattling nor lost motion. By extending the handles below the beam and fastening them to the lower ends of the companion bars, as illustrated, the plow runs much better in practice and when the stock is used for a cultivator and a shovel plow, it is particularly effective. It is a vital part of my invention that I provide very simple means whereby the pitch or inclination of the plow stock may be adjusted. The lower ends of the companion bars are connected to the frog by means of a locking member designated 20 and illustrated in Figs. 2 and 4. This locking member is approximately triangular in form and is perforated as at 21 for the passage of a bolt 22. This bolt 22 passes through the lower ends of the companion bars and is held from removal. The lower end of the rib 5 is angularly cut-away or recessed as at 23 for engagement with the locking member 20, as illustrated clearly in Fig. 2. In attaching the companion bars to the frog, the member 20 is engaged in the recess 23, the companion bars drawn upward and then the bolt 22 is passed through the upper end of the companion bars, locking the companion bars to the lug. It will be noticed particularly that the frog is attached to the standards by only one bolt 10 instead of two bolts as usual, thus greatly facilitating the attachment of the frog to the bars and facilitating the attachment of a plow share. It is to be noticed that my construction gives the plow stock a better leverage and permits of the use of a longer brace. The handles will have much longer life in my construction than they would have where the handles are fastened to the beam with two bolts at their lower ends as is usual. In this latter case, the brace is so short that the lower ends of the handles split and tear up in spite of the mortise that is in the beam. Another advantage of my invention resides in the adjustability of the standards within certain limits. This adjustment is simple and practical and the plow is so constructed as to permit the farmer to use the standard parts in making repairs.

Having thus described my invention, what I claim is:

1. In combination, an approximately straight beam, a stock attached to the beam a short distance from the rear end thereof, a shovel at the lower end of the stock, and handles extending on opposite sides of the rear end of the beam and pivotally connected thereto and having their lower ends projecting below the beam and along opposite sides of the stock and pivotally connected to such stock adjacent the plow shovel.

2. In combination, an approximately straight beam, a plow stock having adjustable connections at its upper end with the beam, handles pivotally connected to the beam in the rear of the plow stock and extending below the beam at a forward and downward inclination and overlapping the plow stock at their lower ends, a brace connected at its upper end to the beam, and means pivotally connecting the lower ends of the members and handles to each other and to the plow stock.

3. In combination, an approximately straight beam, a plow stock adjustably connected to the beam and comprising companion members, handle bars pivotally connected to the beam and extending downward below the same and along the outer sides of the plow stock, a brace attached to the beam and having its lower ends extending between the members forming the plow stock, and a pivot fastening passing through the brace, the handle bars, and the plow stock.

4. In combination, an approximately straight beam, a stock having adjustable connection at its upper end with the beam, a shovel attached to the lower end of the plow stock, handles extending along opposite sides of the beam and below the same with their lower ends overlapping the plow stock, a brace attached to the beam and having its lower ends overlapping the plow stock and handles, and a fastening pivotally connecting the brace, plow stock and handles and disposed adjacent the connection between the shovel and the plow stock.

5. In a plow, upwardly extending spaced companion bars forming a plow stock, an approximately straight beam extending between said companion bars and projecting rearward beyond the companion bars, a foot brace connected to the rear end of the beam and extending downward and forward to and between the companion bars, handles disposed one on each side of the rear end of the beam and extending downward and forward and disposed on each side of the companion bars, a pivot bolt passing through the companion bars and through said foot brace, a bolt passing through the handles and through the rear end of the beam, a rack carried upon the upper face of the beam, a bolt passing through the companion bars immediately below the beam, and a bolt passing through the upper ends of the companion bars and engaging with any one of the notches in the rack.

6. In combination, an approximately straight beam, a plow stock comprising companion members adjustably connected at their upper ends with the beam, a shovel having a projecting portion extending between the lower ends of the members comprising the plow stock, means for connecting the lower ends of said members to each other and to the part projecting from the shovel, a brace attached to the beam and extending forwardly and downwardly and terminating between the companion members forming the plow stock, handle bars extending along the sides of the beam and overlapping opposite sides of the plow stock, and a pivot fastening passing through the lower ends of the handle bars and brace and the companion members forming the plow stock.

7. In combination, an approximately straight beam, a rack disposed upon the beam, a plow stock embodying companion members having their upper ends extending along opposite sides of the beam, transverse fasteners connecting the upper ends of the members, the upper fastener being adapted to engage selected teeth of the rack to hold the plow stock in adjusted position, a shovel having a projecting portion extending between the lower ends of the members forming the plow stock, a brace attached at its upper end to the beam and having its lower end extending between the said companion members, handle bars extending along opposite sides of the beam and pivotally connected thereto and having their lower ends extending along opposite sides of the plow stock, and a pivot fastening passing through the lower ends of the handle bars and brace and through the companion members forming the plow stock.

8. In a plow, a beam, a plow stock including companion bars, and handles disposed in each side of the rear end of the beam rearward of said companion bars and pivotally connected to said beam, the lower end of said handles being pivotally connected to said companion bars.

9. In a plow, a beam, spaced companion bars engaging on each side of the beam, transverse bolts disposed one above and one below the beam, the space between said beams being greater than the thickness of the beam, handles extending downward and forward on each side of the rear end of the beam, a bolt passing through the lower end of said handles on the companion bars and pivotally connecting the handles and companion bars, and a bolt passing through the handles and the rear end of the plow beam and pivotally connecting the handles to the beam.

In testimony whereof I affix my signature in presence of two witnesses.

ALEXANDER PANKEY. [L. S.]

Witnesses:
  J. W. WARD,
  S. C. COOPER.

Copies of this patent may be obtained for five cents each, by addressing the "Commissioner of Patents, Washington, D. C."